US012779972B2

(12) United States Patent
Haefner et al.

(10) Patent No.: US 12,779,972 B2
(45) Date of Patent: Nov. 3, 2026

(54) ARRANGEMENT OF AN ELECTRICAL ENERGY STORE ON A BODY SHELL FOR A PASSENGER CAR

(71) Applicant: Mercedes-Benz Group AG, Stuttgart (DE)

(72) Inventors: Thorsten Haefner, Nuertingen (DE); Hans Kofler, Esslingen (DE); Stefan Katz, Stuttgart (DE); Alexander Klein, Langenbrettach (DE); Volker Sixt, Ostelsheim (DE); Felix Radeck, Stuttgart (DE)

(73) Assignee: Mercedes-Benz Group AG, Stuttgart (DE)

( * ) Notice: Subject to any disclaimer, the term of this patent is extended or adjusted under 35 U.S.C. 154(b) by 212 days.

(21) Appl. No.: 18/847,467

(22) PCT Filed: Mar. 13, 2023

(86) PCT No.: PCT/EP2023/056263
§ 371 (c)(1),
(2) Date: Sep. 16, 2024

(87) PCT Pub. No.: WO2023/174829
PCT Pub. Date: Sep. 21, 2023

(65) Prior Publication Data

US 2025/0214409 A1 Jul. 3, 2025

(30) Foreign Application Priority Data

Mar. 18, 2022 (DE) ..................... 10 2022 000 949.8

(51) Int. Cl.
*H01M 10/613* (2014.01)
*B60K 1/04* (2019.01)
(Continued)

(52) U.S. Cl.
CPC ................ *B60K 1/04* (2013.01); *B60L 50/64* (2019.02); *B60L 50/66* (2019.02); *B62D 21/157* (2013.01);
(Continued)

(58) Field of Classification Search
CPC ................ B60K 1/04; B60K 2001/003; B60K 2001/005; B60K 2001/0438; B60L 50/64;
(Continued)

(56) References Cited

U.S. PATENT DOCUMENTS 11,011,791 B2 5/2021 Kellner et al.
2015/0336452 A1* 11/2015 Decker ................. B62D 25/20 180/68.5
(Continued)

FOREIGN PATENT DOCUMENTS

DE 10 2014 224 545 A1 6/2016
DE 10 2016 212 273 A1 1/2018
(Continued)

OTHER PUBLICATIONS

International Search Report (PCT/ISA/210) issued in PCT Application No. PCT/EP2023/056263 dated Jun. 27, 2023 (2 pages).
(Continued)

*Primary Examiner* — Timothy Hannon
(74) *Attorney, Agent, or Firm* — Crowell & Moring LLP

(57) ABSTRACT

An arrangement of an electrical energy store on a body shell for a passenger car. The body shell has two side sills between which a main floor extends, where the entire main floor is formed by a housing cover of a housing of the electrical energy store. The housing has a lower part which is located, in the passenger car vertical direction, below the housing cover and has a receiving space for storage cells for storing electrical energy. The receiving space is formed by the housing cover and the lower part. The housing cover has
(Continued)

cooling ducts through which coolant is flowable where at least a portion of the electrical energy store is coolable by the coolant. Spaces are located between the storage cells and at least parts of a floor of the lower part.

15 Claims, 6 Drawing Sheets

(51) Int. Cl.

| | |
|---|---|
| ***B60L 50/60*** | (2019.01) |
| ***B60L 50/64*** | (2019.01) |
| ***B62D 21/15*** | (2006.01) |
| ***B62D 25/02*** | (2006.01) |
| ***B62D 25/20*** | (2006.01) |
| ***H01M 10/625*** | (2014.01) |
| ***H01M 10/6556*** | (2014.01) |
| ***H01M 50/209*** | (2021.01) |
| ***H01M 50/213*** | (2021.01) |
| ***H01M 50/242*** | (2021.01) |
| ***H01M 50/249*** | (2021.01) |
| ***H01M 50/271*** | (2021.01) |
| ***H01M 50/342*** | (2021.01) |
| ***H01M 50/358*** | (2021.01) |
| ***H01M 50/367*** | (2021.01) |
| *B60K 1/00* | (2006.01) |

(52) U.S. Cl.

CPC ........... *B62D 25/025* (2013.01); *B62D 25/20* (2013.01); *H01M 10/613* (2015.04); *H01M 10/625* (2015.04); *H01M 10/6556* (2015.04); *H01M 50/209* (2021.01); *H01M 50/213* (2021.01); *H01M 50/242* (2021.01); *H01M 50/249* (2021.01); *H01M 50/271* (2021.01); *H01M 50/3425* (2021.01); *H01M 50/358* (2021.01); *H01M 50/367* (2021.01); *B60K 2001/005* (2013.01); *B60K 2001/0438* (2013.01); *H01M 2200/20* (2013.01); *H01M 2220/20* (2013.01)

(58) Field of Classification Search

CPC ....... B60L 50/66; B62D 21/15; B62D 21/157; B62D 25/025; B62D 25/20; H01M 10/613; H01M 10/625; H01M 10/6556; H01M 50/209; H01M 50/213; H01M 50/242; H01M 50/249; H01M 50/271; H01M 50/3425; H01M 50/358; H01M 50/367; H01M 2200/20; H01M 2220/20

See application file for complete search history.

(56) References Cited

U.S. PATENT DOCUMENTS

| | | | |
|---|---|---|---|
| 2020/0324827 | A1 | 10/2020 | Ahn et al. |
| 2024/0010063 | A1 | 1/2024 | Schilling et al. |

FOREIGN PATENT DOCUMENTS

| | | | |
|---|---|---|---|
| DE | 10 2016 125 693 | B4 | 6/2018 |
| DE | 10 2017 005 314 | A1 | 12/2018 |
| DE | 10 2017 118 120 | A1 | 2/2019 |
| DE | 10 2018 109 296 | B3 | 9/2019 |
| DE | 10 2020 101 679 | A1 | 7/2021 |
| DE | 10 2020 201 410 | A1 | 8/2021 |
| DE | 10 2021 103 378 | B3 | 1/2022 |
| DE | 10 2020 133 960 | A1 | 6/2022 |
| DE | 10 2020 133 961 | A1 | 6/2022 |
| EP | 3 511 184 | A1 | 7/2019 |
| WO | WO 2021/066180 | A1 | 4/2021 |
| WO | WO 2022/017979 | A1 | 1/2022 |

OTHER PUBLICATIONS

German-language German Office Action issued in German Application No. 10 2022 000 949.8 dated Feb. 7, 2023 (5 pages).

* cited by examiner

ARRANGEMENT OF AN ELECTRICAL ENERGY STORE ON A BODY SHELL FOR A PASSENGER CAR

BACKGROUND AND SUMMARY OF THE INVENTION

The invention relates to an arrangement of an electrical energy store on a body shell for a passenger car. In addition, the invention relates to an electrical energy store.

US 2020/0324827 A1 discloses a floor structure for a vehicle, having a main floor which has an opening. In addition, DE 10 2020 101 679 A1 discloses a battery housing for a traction battery of an electrically driven motor vehicle.

EP 3 511 184 A1 discloses a motor vehicle having a body to which a battery housing of a high-voltage battery can be attached. Here, the battery housing is attached to the body so as to act as a main floor pan, and a removable battery cover is located on the underside of the battery housing to act as underride protection.

DE 10 2017 005 314 A1 discloses an electrical energy store for a passenger car, which comprises a housing having a receiving space for storage cells for storing electrical energy. The receiving space is formed by a housing cover and a lower part designed separately from the housing cover. The housing cover has cooling ducts through which a coolant can flow, wherein at least a portion of the electrical energy store can be cooled by means of the coolant. Spaces are located between the storage cells and least parts of a floor of the lower part.

The problem addressed by the present invention is that of providing an arrangement of an electrical energy store on a body shell for a passenger car and an electrical energy store, so as to be able to mount the electrical energy store on the body shell in a particularly advantageous manner and realize a particularly high energy storage capacity and particularly effective protection of the electrical energy store, all while keeping operating costs relatively low.

In the case of the arrangement according to the invention of an electrical energy store, also referred to or designed as a battery, on a body shell, designed in particular as a self-supporting body, for a passenger car, the body shell has two side sills between which a main floor extends. The housing of the electrical energy store has a lower part, which is designed separately from the housing cover and is located below the housing cover in the vehicle vertical direction, and a receiving space for storage cells for storing electrical energy, which receiving space is formed by the housing cover and the lower part. Provision is made in one particularly preferred exemplary embodiment of the arrangement according to the invention that the lower part is reversibly detachably attached to the housing or the housing cover, i.e., the lower part can be taken off and reattached non-destructively for servicing the energy store or in the event of damage, caused for example by it touching down on the ground, or else it can be replaced if damaged.

In order to be able to mount the electrical energy store on the body shell in a particularly advantageous manner and realize a particularly high energy storage capacity of the energy store, it is provided that the entire main floor is formed, in particular exclusively, by a preferably integral and thus single-piece housing cover of a housing of the electrical energy store that is formed separately from the body shell. While, therefore, the side sills are constituent parts of the body shell, the electrical energy store and thus the housing and the housing cover are designed separately from the body shell, i.e., they are not constituent parts of the body shell. This means that the main floor formed entirely by the housing cover also referred to as a battery housing cover is not a constituent part of the body shell, rather the main floor is formed by the housing cover also referred to simply as a cover and is thus a constituent part of the electrical energy store, which is produced separately and thus independently of the body shell. In a method for producing the body shell, the body shell is thus manufactured without a main floor, so that the body shell per se is free of the main floor. For example, the body shell is painted without the main floor and then transferred, for example, to a vehicle assembly line where the electrical energy store is attached to the body shell. In this case, it is in particular conceivable that the electrical energy store is produced and assembled separately and independently of the body shell, in particular fully, and subsequently attached to the body shell. For example, the fully assembled or produced and, in particular, tested electrical energy store is assembled on the body shell by means of screws and/or by means of at least one or a plurality of adhesive bonds. The adhesive bond seals the vehicle all around against the ingress of moisture. The adhesive bond serves a sealing and strengthening function, either entirely or else at least in part. As a result, the electrical energy store closes the body shell, as it were, and completely forms the entire main floor, by means of which the interior of the passenger car is at least predominantly delimited downwards in the vehicle vertical direction, i.e., at least more than half of it is.

The arrangement according to the invention is characterized in that the housing cover has cooling ducts through which a coolant can flow, wherein at least a portion of the electrical energy store can be cooled by means of the coolant, in that spaces are located between the storage cells and at least parts of a floor of the lower part, in that spaces are located between the storage cells and at least parts of a floor of the lower part, in that cell interspaces located between the storage cells are at least partially filled with an intercell structure and the storage cells are thus connected to one another by means of the intercell structure, and in that the intercell structure is designed in such a way that the forces that act when loads occur in the event of an accident involving the passenger car can be transmitted via the intercell structure.

Due to the design of the arrangement according to the invention, it is ensured that even if the motor vehicle makes contact with the ground, which can lead to deformation of the lower part in the direction of the receiving space that receives the storage cells, this does not impair, in particular damage, the cooling system of the electrical energy store, since this is located on the side of the housing facing away from the roadway, adjacent to the interior of a passenger cab and thus in a space that is protected if the vehicle touches down on the ground. The repair costs are also significantly lower in the event that the lower part needs to be exchanged if the damage does not affect the cooling system of the electrical energy store. Forces that occur, for example, when the vehicle is travelling and are operating loads or that occur in the event of an accident and are therefore accident-related loads are transmitted via the intercell structure and are thus at least partially kept away from the storage cells.

By means of the integrated cooling ducts provided on or in the housing cover and through which a preferably liquid coolant can flow so that at least a portion of the electrical energy store, in particular the storage cells, can be cooled via the housing cover by means of the coolant flowing through the cooling ducts, particularly advantageous cooling can be realized on the one hand. On the other hand, an advantageously large amount of installation space can be created, in particular in the vehicle vertical direction (z direction), so that a particularly high energy storage capacity of the energy store can be achieved. In addition, the housing cover is heated to a certain extent by the coolant when the vehicle is moving, so that a certain amount of heat is transferred/radiated into the passenger cab due to the arrangement of the cooling system in the region close to the passenger compartment, which can increase ride comfort. In other words, the housing cover/main floor acts as a kind of underfloor heating system inside the passenger cab.

The side sills delimit, for example, a through-opening to the outside on both sides in the vehicle transverse direction, in particular directly. The through-opening extends uninterrupted for example from side sill to side sill and thus over the entire interspace that is located between the side sills in the vehicle transverse direction. It is conceivable that the side sills are connected to one another by at least one or a plurality of transverse elements, wherein it is preferably provided that the respective transverse element is a constituent part of the body shell. In particular, the respective transverse element can be a seat crossmember. Since the entire main floor is formed entirely by the housing cover, no floor element of the body shell is located in vehicle vertical direction between the housing cover and the transverse elements designed in particular as crossmembers. The through-opening ends at the rear in the vehicle longitudinal direction for example at a rear floor, which is a constituent part of the body shell. When the passenger car is fully assembled, a seating system of the passenger car, which is designed in particular as a rear seat bench and is located in a rear region of the interior, is located above the rear floor. In this case, the opening is completely overlapped by the housing cover and thus closed. In the arrangement, the housing also referred to as store housing is inserted as a whole into the body shell, in particular into the through-opening, with the housing cover forming the entire main floor.

The electrical energy store is also referred to as a traction store or traction battery, since at least one electrical machine for electrically driving the passenger car, in particular purely electrically, can be supplied with electrical energy which is or is to be stored in the electrical energy store, in particular electrochemically. As a result, the electrical machine can be operated in motor mode and thus as an electric motor, by means of which the passenger car can be driven electrically, in particular purely electrically.

The invention makes it possible to produce the body shell and the electrical energy store independently of each other and to certify them independently of each other, although the invention provides a high-level integration concept, as part of which the electrical energy store is integrated into the body shell. Compared to conventional solutions, tolerance allowances for the electrical energy store in the body shell can be reduced as a result. This means that a particularly large amount of installation space is available to accommodate the energy store, so that the energy store can be designed to be particularly large and thus with a correspondingly high energy storage capacity. A particularly long electric range of the passenger car can be achieved as a result. Due to an advantageous arrangement within the energy store or within the housing, tolerances and structural component allowances can also be reduced there compared to conventional solutions, so that a particularly large amount of installation space can be created, for example, to accommodate storage cells for storing the electrical energy, in particular electrochemically.

The invention is based in particular on such conventional solutions in which traction batteries are screwed onto a respective body shell of a passenger car. In this case, however, corresponding tolerances must be retained, and this therefore always creates areas that, with the exception of tolerance allowance, perform no function. Moreover, cell modules are conventionally inserted into the housing as individual modules and are only partially bound by structural requirements. Owing to a multiplicity of individual systems as well as joining and tolerance clearances, there tends to be very little cell installation space in conventional solutions, so that only a low energy storage capacity can be realized. In contrast, the invention enables the housing and the storage cells also referred to simply as cells to be combined to form one large cell module and thereby form a shear-resistant overall structure which, after joining the energy store, in particular the housing, to the body shell, forms the passenger car as a shear-resistant overall vehicle. Due to the high-level integration concept, the electrical energy store and the body shell can still be manufactured, assembled and in particular certified independently of each other. Compared to conventional solutions, the invention enables tolerance allowances, individual parts and manufacturing costs and effort to be reduced. The housing can be incorporated completely into the body shell, in particular the structure of same, so that vibration behaviour can also be improved compared to conventional solutions.

In a further embodiment of the invention, the electrical energy store has the aforementioned storage cells for storing the electrical energy, in particular electrochemically. It has been shown to be particularly advantageous in this case if the storage cells are secured to the housing cover. As a result, a particularly space-saving arrangement of the storage cells can be realized, so that a particularly large energy storage capacity can be achieved. In addition, the energy store can be serviced or repaired for example, in particular after the energy store has been joined to the body shell, since, for example, the housing can be opened while the housing cover and thus the storage cells secured on the housing cover can remain connected to the body shell, i.e., installed on the body shell. It is thus preferably provided that the housing cover is attached, in particular directly, to the body shell. For example, the housing cover is attached to the body shell by adhesive bonding and/or by at least one or a plurality of screw connections.

In the arrangement according to the invention, the lower part of the housing is designed separately from the housing cover. In this case, the receiving space is formed by the housing cover and the lower part, in particular in each case directly. The storage cells are located in the receiving space. It is conceivable here in particular that the cover is attached to the body shell independently of the lower part. The lower part is preferably located entirely below the housing cover in the vehicle vertical direction, and therefore the housing cover is also referred to as an upper part or housing upper part. Accordingly, the lower part is also referred to as a housing lower part. The aforementioned opening of the housing is effected, for example, such that the lower part is detached and removed from the cover and thus from the body shell, while the cover and thus the storage cells remain secured or attached to the body shell. This makes the storage cells accessible, without having to separate the cover and the storage cells from the body shell. It is provided in particular that the storage cells are secured to the cover independently of the lower part.

In order to be able to realize a particularly space-saving arrangement and thus a particularly large energy storage capacity of the energy store as well as particularly safe operation, it is provided in another embodiment of the invention that a protective structure is located in the receiving space, by means of which the storage cells are overlapped on both sides towards the outside in the vehicle transverse direction. The protective structure can be designed separately from the housing and separately from the storage cells. For example, the protective structure is connected to the housing, in particular adhesively bonded to it. The protective structure can, for example, absorb accident-related loads acting inwards in the vehicle transverse direction and hence in the direction of the storage cells and absorb the loads, for example, by deforming the protective structure, whereby the storage cells can be protected in a space-saving manner from excessive loads caused by accidents.

In another embodiment of the invention, degassing ducts are located in the receiving space, which are also referred to as air-extractor ducts or vent ducts and are for example constituent parts of the lower part. In the case of a thermal event in the electrical energy store, gas resulting from the thermal event and flowing out of at least one of the storage cells can flow through the degassing ducts. The thermal event happens, for example, during or as a result of an electrical short circuit in the at least one storage cell, wherein the short circuit can result, for example, from the application of force to the energy store, caused in particular by an accident. The aforementioned gas which has a high temperature is produced during the thermal event, for example from an in particular liquid electrolyte of the at least one storage cell. The gas is first produced, for example, in the at least one storage cell and creates such a pressure in a cell housing of the at least one storage cell that a degassing element of the cell housing, designed for example as a blow-out disc, fails, in particular targetedly, whereupon the gas can flow out of the cell housing. Consequently, the gas can flow through the degassing ducts so that the gas is targetedly discharged from the receiving space and from the storage cell by means of the degassing ducts. This prevents thermal propagation, i.e., undesired propagation of the thermal event. Thermal propagation is understood as meaning that the thermal event spreads from the at least one storage cell to the other storage cells; however, this can be prevented or at least delayed by the degassing ducts.

The degassing ducts are preferably constituent parts of a degassing device of the energy store, the degassing device of which also has a particle separator for example. The gas that flows through the degassing ducts can flow through the particle separator, which can separate particles, in particular hot particles, contained in the gas out of the gas. Furthermore, it is conceivable that the degassing device has at least one further degassing element, designed for example as a further blow-out disc, which the gas flowing through the degassing ducts can flow against and/or around, in particular directly, and which can consequently fail, in particular targetedly, in particular break. As a result, for example, a degassing opening in the housing is exposed, in particular the lower part, so that the gas can be discharged from the housing, for example to the surrounding area. Particularly safe operation can be realized as a result in a particularly space-saving manner.

In one advantageous embodiment of the invention, it is provided that the degassing ducts are located below the storage cells in the vehicle vertical direction. The gas is also conducted away by the cooling system, i.e., by the cooling ducts integrated in the housing cover, so that the cooling system per se can continue to function correctly and the risk of the electrical energy store overheating is at least reduced.

In another, particularly advantageous embodiment of the invention, the degassing ducts are formed by a zigzag-shaped or wavy structural element, in particular the lower part, and in particular are directly delimited. The storage cells are overlapped by the structural element downwards, in particular fully, in the vehicle vertical direction of the passenger car also referred to as vehicle. The structural element has at least a dual function. Firstly, the structural element is used to form the degassing ducts. Secondly, the zigzag-shaped or wavy design means that the structural element has a particularly high energy absorption capacity, so that the component can absorb loads acting on the energy store for example in the vehicle vertical direction from bottom to top and thus in the direction of the storage cells, and can absorb the loads, for example, by deforming the structural element, whereby these loads are kept away from the storage cells or whereby the structural element protects the storage cells from excessive loading. Such loads, acting in vehicle vertical direction from bottom to top and in the direction of the storage cells, occur when the energy store touches down on a kerb or the ground when the passenger car pulls out from a kerb for example. Owing to the dual function, the storage cells can be protected in a space-saving and weight-saving manner, so that other weight-intensive and space-intensive protective measures can be avoided. As a result, the energy store can have a particularly large energy storage capacity.

Lastly, it has been shown to be particularly advantageous if the housing cover has a frame with lateral energy absorption elements, each of which has a plurality of hollow chambers. For example, the storage cells are at least partially overlapped by the energy absorption elements on both sides towards the outside in the vehicle transverse direction. The energy absorption elements can advantageously absorb loads caused by an accident and acting inwardly in the vehicle transverse direction and thus in the direction of the storage cells, whereby the storage cells can be protected in a space-saving and weight-saving manner.

Lastly, the problem is also solved with an electrical energy store having the features herein.

Further advantages and details of the invention emerge the following description and with reference to the drawings.

DETAILED DESCRIPTION OF THE DRAWINGS

Figure 1:
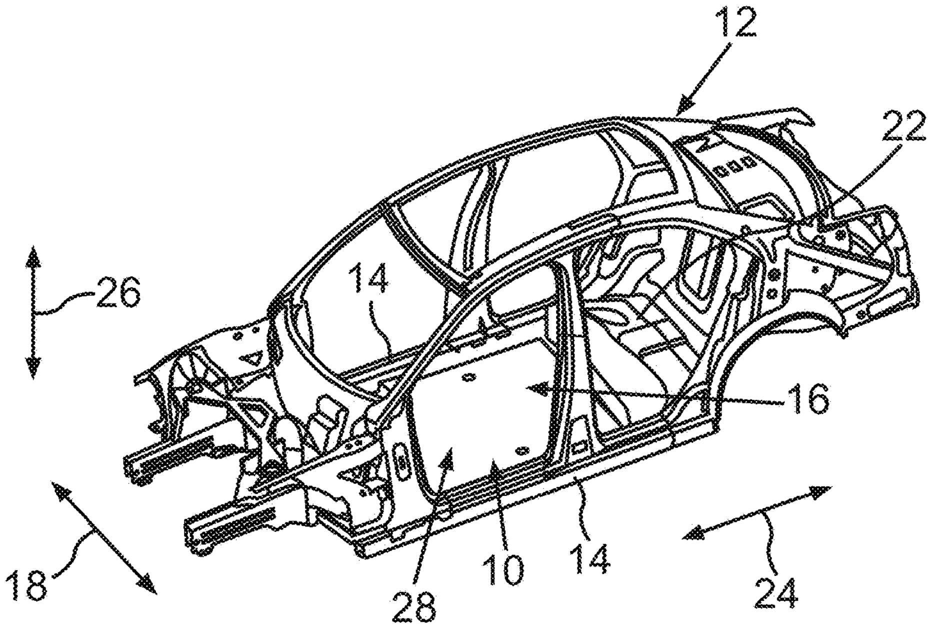
FIG. 1 shows a schematic perspective view of an arrangement of an electrical energy store on a body shell for a passenger car, in which the body shell has two side sills between which a main floor extends, wherein the entire main floor is formed exclusively by a housing cover of a housing of the electrical energy store designed separately from the body shell.

FIG. 1 shows in a schematic perspective view an arrangement of an electrical energy store 10 on a body shell 12, designed as a self-supporting body, of a passenger car. The electrical energy store 10 is also referred to as a battery or traction battery or is designed as a battery, in particular as a traction battery. In particular, the electrical energy store 10 is a high-voltage component with a voltage of several 100 volts.

Figure 2:
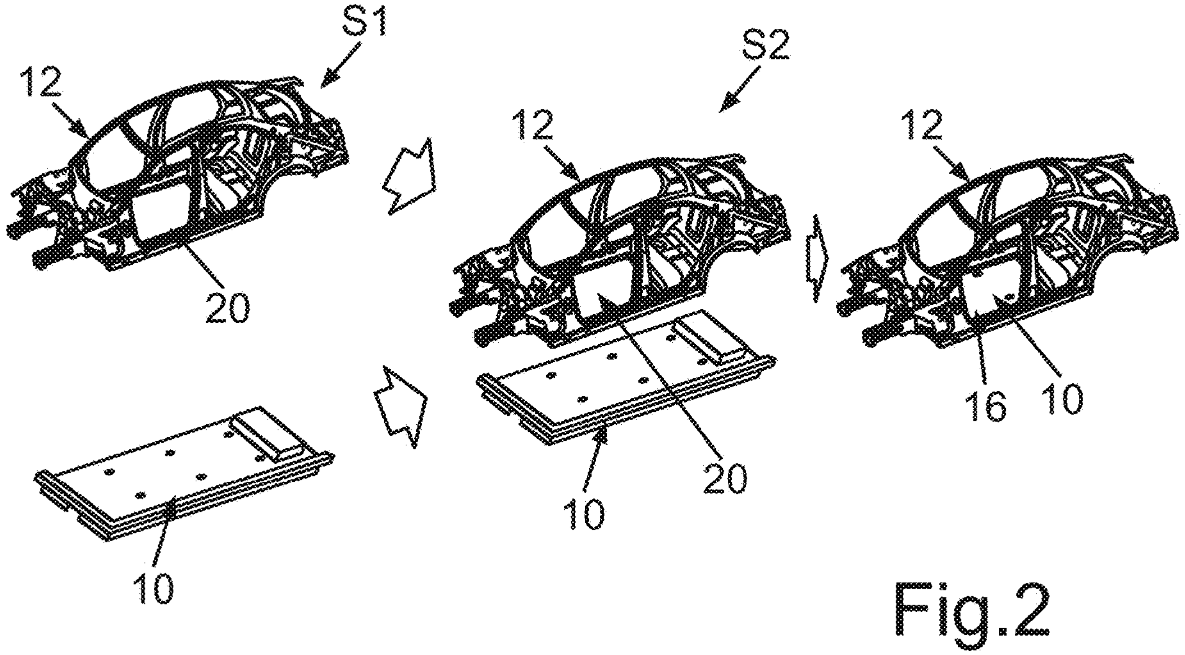
FIG. 2 is a schematic illustration of a sequence of a method for producing the arrangement according to the invention.

In conjunction with FIG. 2, it is particularly easy to see that the body shell 12 has two side sills 14 spaced apart from each other in the vehicle transverse direction, between which a main floor 16 extends. The vehicle transverse direction is illustrated in FIG. 1 by a double-headed arrow 18 and is also labelled y or y direction in the vehicle coordinate system. It can be seen that the side sills 14 directly delimit a through-opening 20 of the body shell 12 on both sides towards the outside in the vehicle transverse direction, which extends rearwards in the vehicle longitudinal direction as far as a rear floor 22 of the body shell 12. The vehicle longitudinal direction is illustrated by a double-headed arrow 24 and is also labelled x direction in the vehicle coordinate system or x.

When the passenger car is fully assembled, a seating system of the passenger car which is designed for example as a seat bench is located above the rear floor 22 in the vehicle vertical direction, wherein the seating system is located for example in a rear region of the interior of the passenger car and thus provides at least one or a plurality of seat places for rear passengers of the passenger car. The vehicle vertical direction is illustrated by a double-headed arrow 26 and is also labelled z direction in the vehicle coordinate system or z. In particular, the through-opening 20 extends in the vehicle transverse direction over the entire interspace located in vehicle transverse direction between the side sills 14 and thus over more than half of the width of the interior. In addition, it is conceivable that the through-opening 20, viewed in the longitudinal direction, extends over more than the length of the interior, in particular continuously, i.e., uninterrupted.

Figure 5:
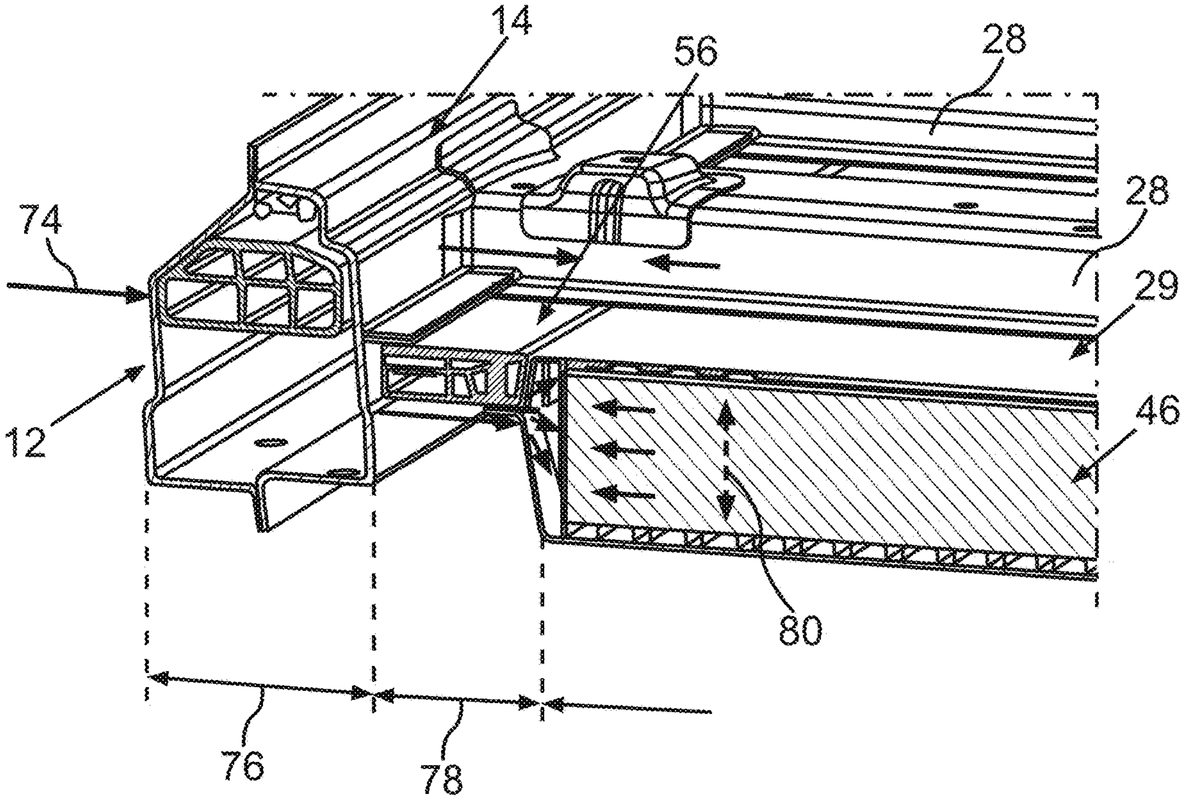
FIG. 5 shows an excerpt from a schematic and cutaway perspective view of the arrangement.

It can be seen in FIG. 5 that the side sills 14 can be connected to one another by, for example, transverse elements, designed as crossmembers 28, of the body shell 12, wherein the crossmembers 28 are mounted, in particular directly, on the side sills 14. For example, the crossmembers 28 are seat crossmembers, to which, for example, further seating systems, designed in particular as individual seats, of the passenger car can be attached. In particular, the further seating systems are located in a rear region in the interior. The crossmembers 28 are thus constituent parts of the body shell 12.

In order to mount the energy store 10 on the body shell 12 in a particularly advantageous manner and to realize an energy store 10 with a particularly large energy storage capacity, the entire main floor 16 is exclusively and entirely formed by a housing cover 29 of a housing 30, also referred to as a store housing or battery housing, of the electrical energy store 10 designed separately from the body shell 12. Since the electrical energy store 10 is designed separately from the body shell 12, the housing 30 and thus the housing cover 29 also referred to simply as cover are designed separately from the body shell 12. Therefore, the entire main floor 16, which completely overlaps and thus closes the entire through-opening 20, is not for instance a constituent part of the body shell 12, which is thus free of a main floor. This also means that no floor element of the body shell 12 is located between the respective crossmember 28 and the housing cover 29 in the vehicle vertical direction. It can be seen from FIG. 4, for example, that the entire main floor 16 is entirely formed by a cover part 32 of the housing cover 29, formed for example from sheet metal, the cover part 32 preferably being integral, i.e., it is formed from a single piece. Since the cover part 32 is preferably formed from sheet metal, the cover part 32 is also referred to as a cover panel. Thus, for example, the cover panel completely forms the entire main floor 16. The cover panel (cover part 32) is thus a floor pan forming the entire main floor 16, which however is not a constituent part of the body shell 12, but rather a constituent part of the energy store 10 designed separately from the body shell 12.

FIG. 2 shows a schematic illustration of a method for producing the arrangement. The body shell 12 and the energy store 10 are, for example in a first step S1, produced separately and independently from one another and in particular in each case fully. For example, in a second step S2 that follows the first step S1 in particular, the body shell 12 and the energy store 10 are connected to each other after they have been produced, in particular fully, in particular in such a way that the energy store 10 is joined to the body shell 12. Here, for example, the housing cover 29 is inserted into the through-opening 20 and, for example, the housing cover 29 is connected, in particular directly, to the body shell 12, in particular to the side sills 14 and thus fastened on the body shell 12, in particular on the side sills 14. For example, the energy store 10, in particular the housing cover 29, is adhesively bonded and/or screwed to the body shell 12, in particular to the side sills 14. The energy store 10 is thus, for example, an integrated structural battery, although the body shell 12 and the energy store 10 are individual structures which can be manufactured independently of each other and in particular also certified. Thus, for example, the body shell 12 and the energy store 10 can be produced by means of existing production lines. The advantage over conventional methods is, however, that at least virtually all air gaps that have to be retained in conventional solutions due to component tolerances and assembly clearances can be minimized or at least partially avoided. As a result, a particularly advantageous crash structure and a particularly large installation space for accommodating the energy store 10 can be provided. Consequently, a particularly high level of safety of the passenger car and a high energy storage capacity of the energy store 10 can be achieved, so that a particularly long electric range of the passenger car is made possible.

Since the through-opening 20 is not closed by the body shell 12, but by the housing cover 29 of the energy store 10 designed as a pre-assembled, ready-to-install module or assembly part, the energy store 10 closes off the body shell 12 and forms the entire main floor 16. Compared to conventional solutions, only minimal joining tolerances are needed for this purpose. An otherwise customary gap between a conventionally provided floor pan of the body shell 12 and the housing 30 can be dispensed with, Such a gap would have to be additionally sealed and filled with noise insulation mats in order to realize corrosion protection and an advantageous noise behaviour, but this is now no longer necessary due to the arrangement according to the invention.

Figure 4:
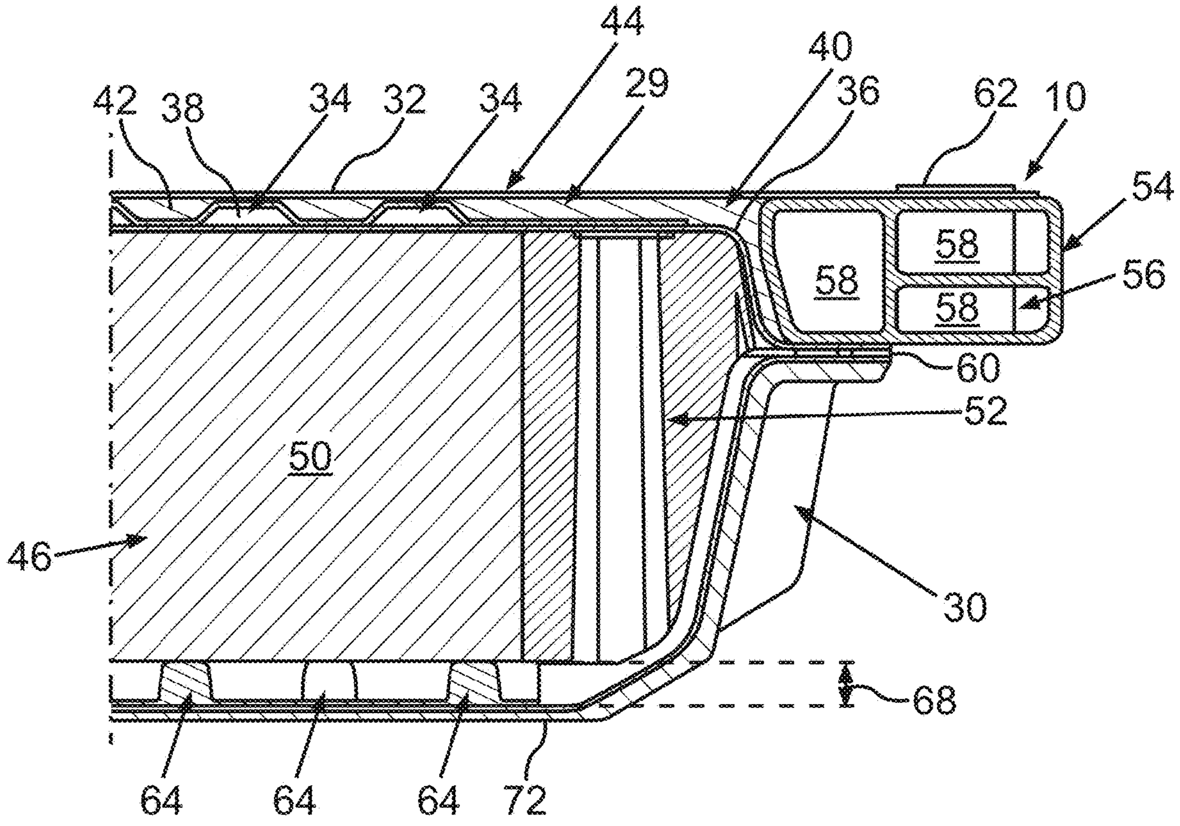
FIG. 4 shows an excerpt from a schematic cross-sectional view through the energy store.

It can be seen particularly clearly from FIG. 4 that the housing cover 29 has cooling ducts 34 through which a preferably liquid coolant can flow. The housing cover 29 has, for example, the cover part 32 and a second cover part 36, wherein the cover parts 32 and 36 are designed separately from one another and are connected to one another at least indirectly. The housing cover 29 comprises a duct element 38 which, for example, is designed separately from the cover parts 32 and 36. In the exemplary embodiment shown in FIG. 4, the duct element 38 is, for example, connected to cover part 36 at least indirectly, in particular directly, so that the respective cooling duct 34 is directly delimited by the cover part 36 and by the duct element 38 in each case in part. Interspaces 40 also referred to as cavities can be located between the cover part 32 and the duct element 38 and between the cover parts 32 and 36, in which case an element 42 such as an adhesive can be located in the cavities 40. In particular, the respective interspace 40, also referred to as cavity or designed as a cavity, is filled completely with the element 42. The housing cover 29 thus forms or comprises a cooling plate 44, which comprises at least the duct element 38 and the cover part 36 and thus through which the coolant can flow. The cooling plate 44 is an upper cooling plate, since storage cells 46 of the electrical energy store 10 are overlapped upwards in the vehicle vertical direction by the cooling plate 44. The storage cells 46 can advantageously be cooled by means of the coolant via the cooling plate 44. When viewed upwards in the vehicle vertical direction, for example the cooling plate 44 or the housing cover 29 is thus an end plate. In this case, it is conceivable in particular that the storage cells 46 are mounted directly on the cooling plate 44 and thus directly on the housing cover 29 and are thus secured on the housing cover 29. In particular, it is conceivable that the storage cells 46 also referred to simply as cells are inserted directly into the housing cover 29, also referred to as housing upper part or upper part.

The housing 30 has a lower part 48 which is also referred to as a housing lower part, is designed separately from the housing cover 29 and is connected at least indirectly, in particular directly, to the housing cover 29. The lower part 48 and the housing cover 29 each partially and preferably each directly delimit a receiving space 50 of the housing 30, in which receiving space 50 the storage cells 46 designed separately from the housing 30 are located. In this case, it is provided in particular that the storage cells 46 are secured on the housing cover 29 independently of the lower part 48.

It conjunction with FIG. 5 it can readily be seen that a protective structure 52 also referred to as a replacement structure is located in the receiving space 50, by means of which structure the storage cells 46 are overlapped on both sides towards the outside and preferably completely in the vehicle transverse direction. The replacement structure is or functions as a crash element, which is also referred to as an accident element and protects the storage cells 46 from excessive loading, for example caused by an accident-related application of force acting in the vehicle transverse direction from the outside inwards and thus in the direction of the storage cells 46. In particular, it is conceivable that the housing lower part is reversibly detachably connected to the housing cover 29 and can thus be detached and removed from the housing cover 29, without the housing cover 29 or the lower part 48 being destroyed or damaged in the process. Therefore, the lower part 48 also referred to as a housing lower part can, for example, be detached or removed from the housing cover 29 and thus taken off, while the housing cover 29 and, via the latter, the storage cells 46 remain secured on the body shell 12. As a result, for example, the electrical energy store 10 can be serviced or repaired particularly advantageously, in particular without the housing cover 29 or the storage cells 46 having to be detached from the body shell 12 for this purpose.

The housing cover 29 also has a frame 54 with lateral energy absorption elements 56, wherein the respective energy absorption element 56 has a plurality of hollow chambers 58 which are separated from one another in the present case. For example, the energy absorption element 56 is designed as an extruded profile. It can be seen from FIG. 4 that the energy absorption element 56, in particular the frame 54, is designed separately from the cover parts 32 and 36 and is connected at least indirectly, in particular directly, to the cover parts 32 and 36. The lower part 48 can be mounted, in particular directly, on the energy absorption element 56 or on the frame 54 and/or on the cover part 36. In the exemplary embodiment shown in FIG. 4, a seal 60 is located between the lower part 48 and the cover part 36, by means of which the lower part 48 is sealed off from the housing cover 29, whereby the receiving space 50 is sealed off. Furthermore, the seal 60 can be used to compensate for tolerances. It can be seen that the storage cells 46 are overlapped on both sides towards the outside in the vehicle transverse direction and in each case at least partially by the energy absorption elements 56, whereby the storage cells 46 can be protected particularly advantageously.

At least one mounting element 62 is provided on the respective energy absorption element 56, by means of which the respective energy absorption element 56 and, via the latter, the housing cover 29 and thus the energy store 10 as a whole can be attached to the respective side sills 14, in particular screwed on. In the present case, the mounting element 62 comprises a sleeve which is also referred to or designed as a screw sleeve for example. For example, a screw can be pushed through the sleeve, so that by means of the screw, the housing cover 29 and thus the energy store 10 can be screwed onto the body shell 12, in particular onto the respective side sills 14.

By way of example, the replacement structure (protective structure 52) forms a frame also referred to as module frame or cell module frame, into which the individual storage cells 46 also referred to simply as cells have been or are inserted. For example, intercellular spaces located between the storage cells 46 are at least partially, in particular at least predominantly or completely, filled with an intercell structure, in particular in such a way that the storage cells 46 are connected to one another and/or to the replacement structure by means of the intercell structure. Consequently, for example, the storage cells 46 form a contiguous structural body with the replacement structure, which for example also comprises the intercell structure. For example in the event of an accident or when the passenger car is being driven, the structural body can provide corresponding counterforces which counteract the loads that occur in each case, thereby avoiding excessive, undesirable noises for example and protecting the storage cells 46 advantageously.

Figure 3:
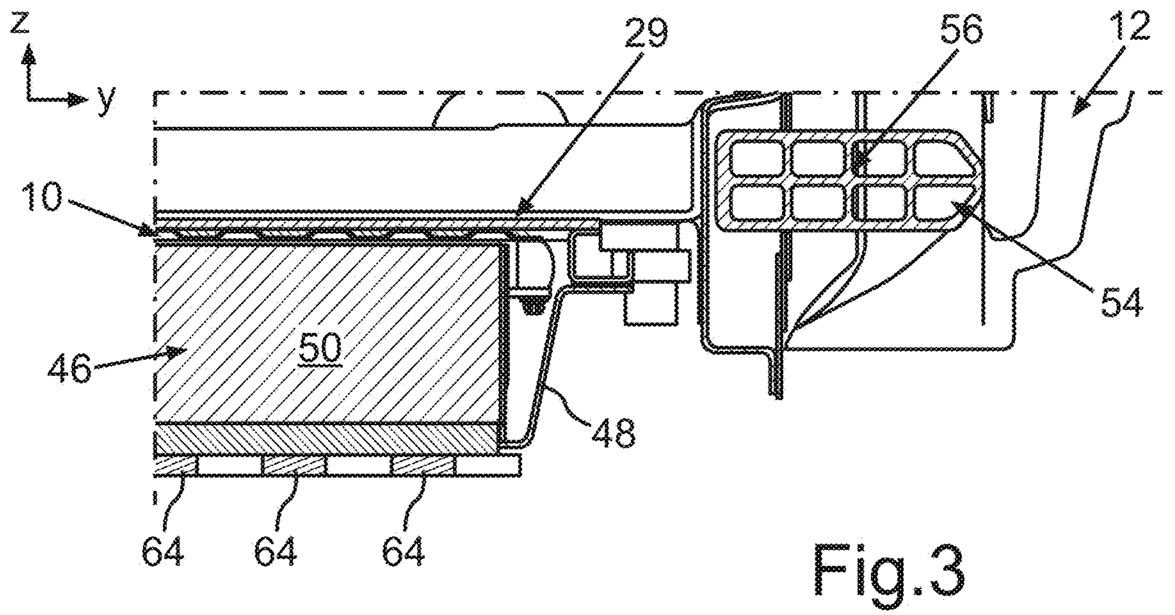
FIG. 3 shows an excerpt from a schematic cross-sectional view through the arrangement.

As can be seen from FIGS. 3 and 4, degassing ducts 64 also referred to as air-extraction ducts or vent ducts are located in the receiving space 50. The degassing ducts 64 are located below the storage cells 46 in the vehicle vertical direction. Spaces 68 are located between the storage cells 46 and at least parts of a floor 66 of the lower part 48 in the vehicle vertical direction, which spaces 68 can be used for so-called touchdown management, for tolerance compensation and for removal of so-called venting gas. Touchdown management is understood as meaning that the storage cells 46 can be protected for example from excessive loading if the lower part 48, in particular the floor 66, touches down on the ground, for example when the passenger car is pulling out from a kerb, whereby a load acts on the energy store 10 from bottom to top in the vehicle vertical direction and in the direction of the storage cells 46.

Figure 6:
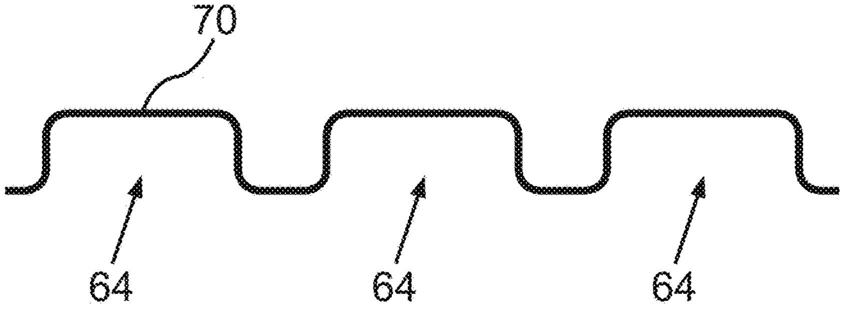
FIG. 6 shows an excerpt from a schematic cross-sectional view through a structural element of the energy store.

It can be seen in conjunction with FIG. 6 that the respective degassing ducts 64 can be formed at least in part by a structural element 70 located in the receiving space 50, in which case the structural element 70 can be a constituent part of the lower part 48. In the exemplary embodiment shown in the figure, the floor 66 is formed by a first component 72 of the lower part 48, wherein the structural element 70 and the component 72 are designed separately from one another and are thus indirectly, in particular directly, connected to one another. For example, the respective degassing duct 64 is in each case partially and preferably in each case directly delimited by the component 72 and the structural element 70. The structural element 70 has a wavy cross-section with at least substantially U-shaped portions, each of which can be designed as a convex profile. As a result, the structural element 70 which overlaps the storage cells 46 downwards in the vehicle vertical direction has a particularly large energy absorption capacity, whereby the storage cells 46 can be protected against excessive loading when the energy store 10 touches down, for example.

The respective degassing duct 64 can be flowed through by the aforementioned gas which is produced when there is a thermal event in the electrical energy store 10. By means of the degassing ducts 64, the gas can be discharged from the storage cells 46, so that thermal propagation can be avoided. This discharging of the gas is the aforementioned removal of the gas. It is conceivable that the storage cells 46 are supported, in particular directly, downwards in vehicle vertical direction on the structural element 70 and in particular on the aforementioned portions thereof, in order to thereby particularly advantageously create the spaces 68 between the portions and the storage cells 46. The spaces 68 are therefore reserved in order to be able to advantageously remove the gas flowing out of at least one of the storage cells 46 in the case of a thermal event. The gas also referred to as venting gas can be conducted by means of the degassing ducts 64 to a particle separator and to at least one bursting element which can targetedly fail and thus expose an exit opening in the housing 30, in particular in the lower part 48. In particular because of its wavy shape, the structural element 70 functions as a load distributor, which can transmit and distribute a force acting at specific points, and in particular in the vehicle vertical direction from bottom to top, over a large area, in particular onto the aforementioned intercell structure.

It can be seen that the seal 60 is located between respective sealing flanges of the lower part 48, in particular the component 72, and the cover part 36 and in the process is supported in particular directly on the sealing flanges. In this case, component tolerances can be compensated both on the respective sealing flange itself and in a lower region by the respective space 68. As a result, regions which do not fulfil any tasks when the passenger car is fully assembled can be avoided or advantageously kept to a minimum. Furthermore, it is conceivable that the structural element 70 provides electrical insulation, in particular between the respective storage cell 46 and the lower part 48.

Figure 7:
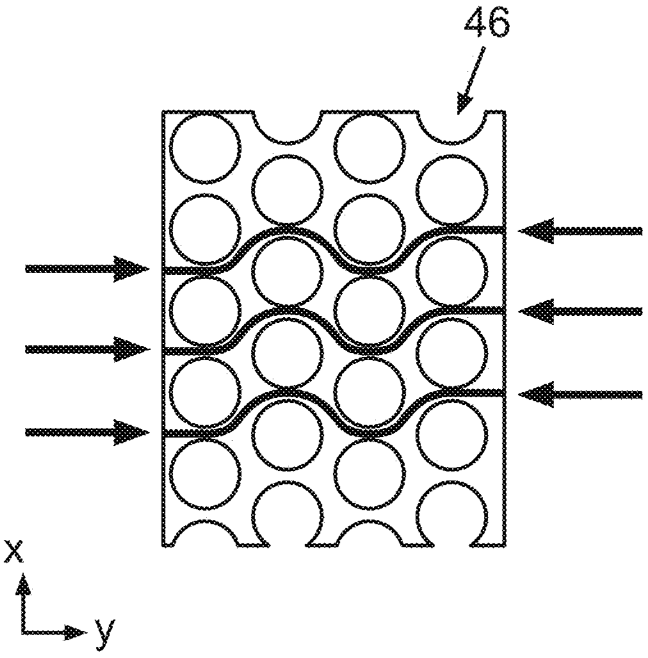
FIG. 7 shows a schematic plan view of storage cells of the energy store according to a first embodiment.
Figure 8:
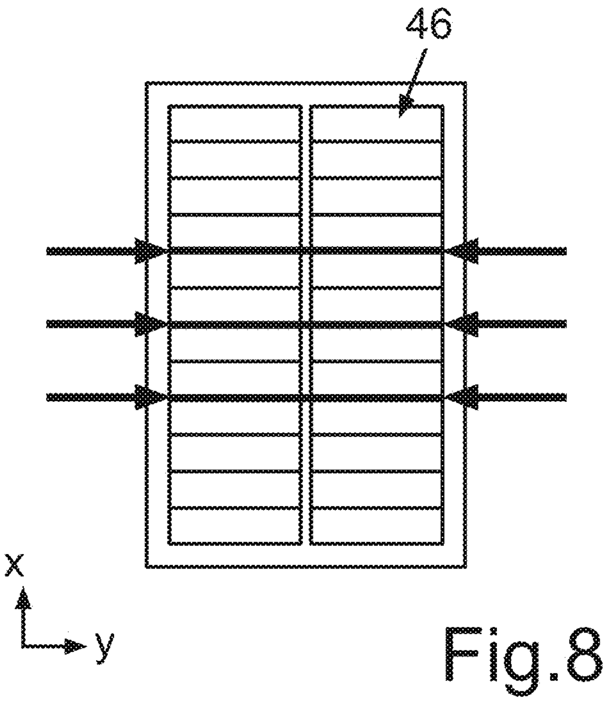
FIG. 8 shows a schematic plan view of storage cells of the energy store according to a second embodiment.

FIG. 7 shows that the respective storage cell 46 can be designed as a round cell, which has the shape of an, in particular right, circular cylinder. FIG. 8 shows that the respective storage cell 46 can be designed as a prismatic storage cell.

In FIG. 5, an arrow 74 illustrates a force which acts, for example in the event of an accident, on one of the side sills 14 from the outside inwards in the vehicle transverse direction. The one side sill 14 forms a first deformation zone 76, in which the side sill 14 can deform, thereby absorbing energy. A second deformation zone adjoining the first deformation zone 76 inwards in the vehicle transverse is labelled 78 and is formed by the energy absorption element 56. The energy absorption element 56 can also be deformed by the accident-related force and thereby absorb accident energy, whereby the storage cells 46 can be advantageously protected. In FIG. 5, arrows illustrate a load or energy distribution which occurs as a result of the force illustrated by the arrow 74. A double-headed arrow 80 illustrates that the energy store 10 supports the crossmember 28, also referred to as body shell crossmember, in the event of an accident. As a result, a height, extending in the vehicle vertical direction, of the respective crossmember 28 can be kept low, so that the energy store 10 can have a particularly great height, extending in the vehicle vertical direction. In FIGS. 7 and 8, arrows illustrate a transmission of forces that occur, for example, when the vehicle is travelling and are operating loads or that occur in the event of an accident and are therefore accident-related loads. The forces are transmitted via the intercell structure and are thus at least partially kept away from the storage cells 46. Therefore, in particular, accident-related forces and/or torques can be absorbed via the replacement structure, the intercell structure and the frame 54, whereby the storage cells 46 can advantageously be protected.

Figure 9:
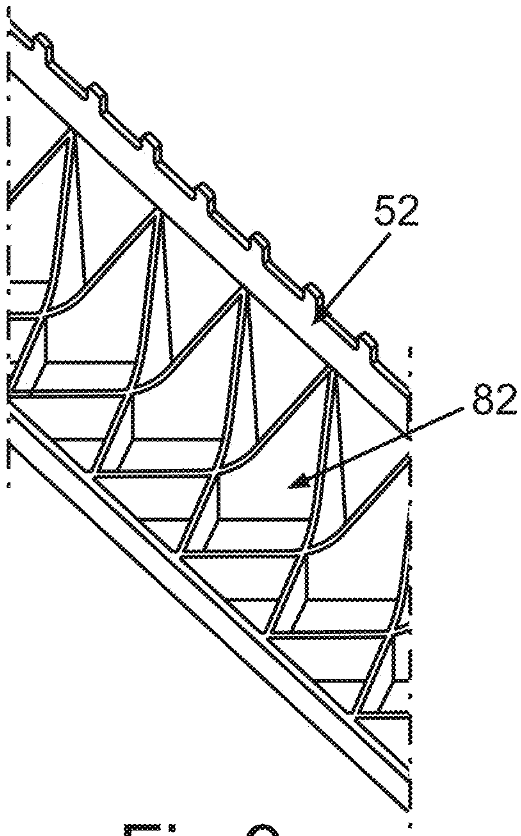
FIG. 9 shows an excerpt from a schematic perspective view of a protective structure, also referred to as replacement structure, of the energy store.

FIG. 9 shows an excerpt from the replacement structure in a schematic perspective view. The replacement structure (protective structure 52) comprises, for example, grid pockets 82. Local filling or replenishment of the grid pockets with, for example, adhesive and/or foam and/or an insert is conceivable in order to be able to absorb and transmit particularly high moments and/or forces locally.

Figure 10:
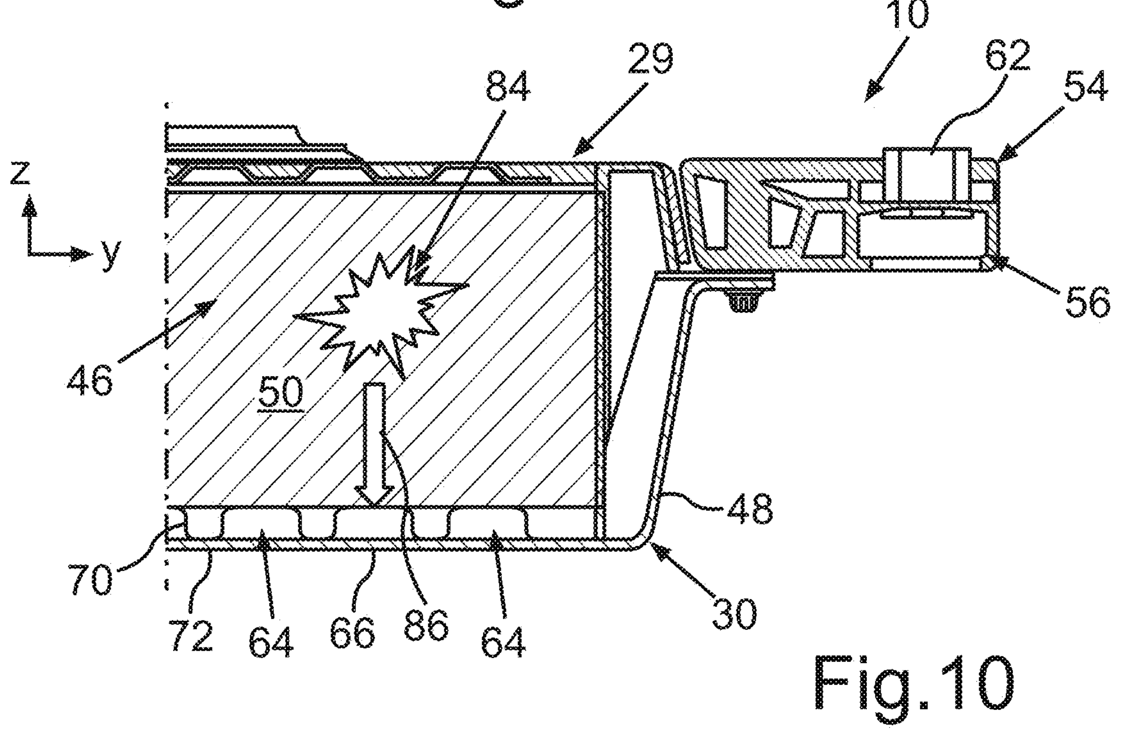
FIG. 10 shows an excerpt from a schematic cross-sectional view through the energy store in the case of a thermal event.
Figure 11:
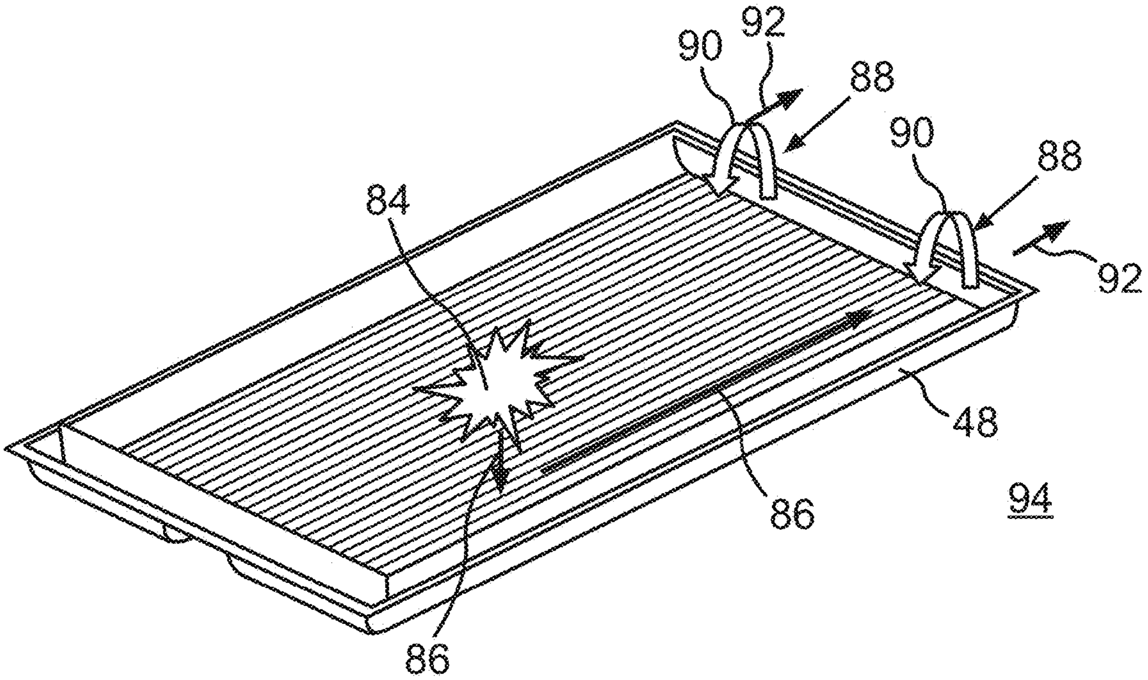
FIG. 11 shows a schematic and perspective plan view of a lower part of the energy store during the thermal event.

FIGS. 10 and 11 illustrate the aforementioned thermal event 84, depicted here particularly schematically. The thermal event can produce the aforementioned gas, which entrains hot particles, the flow of which is illustrated in FIG. 10 by an arrow 86. It can be seen that the gas can flow to and into the spaces 68 or the degassing ducts 64 and consequently be conducted in an advantageous manner as required. In FIG. 11, the gas or flow thereof is illustrated by arrows 86. The gas or flow thereof is conducted by means of the degassing ducts 64, for example rearwards in the vehicle longitudinal direction and in the process, for example, to bursting elements which can be located at points 88 on the lower part 48. In particular, the gas is conducted to the bursting elements via particle separators 90 shown particularly schematically in FIG. 11. The particle separators 90 separate off any particles present in the gas. As is illustrated in FIG. 11 by arrows 92, the bursting elements can fail, in particular targetedly, and thereby expose a respective through-opening of the lower part 48, whereupon the gas can flow out of the housing 30 to the surrounding area 94.

Figure 12:
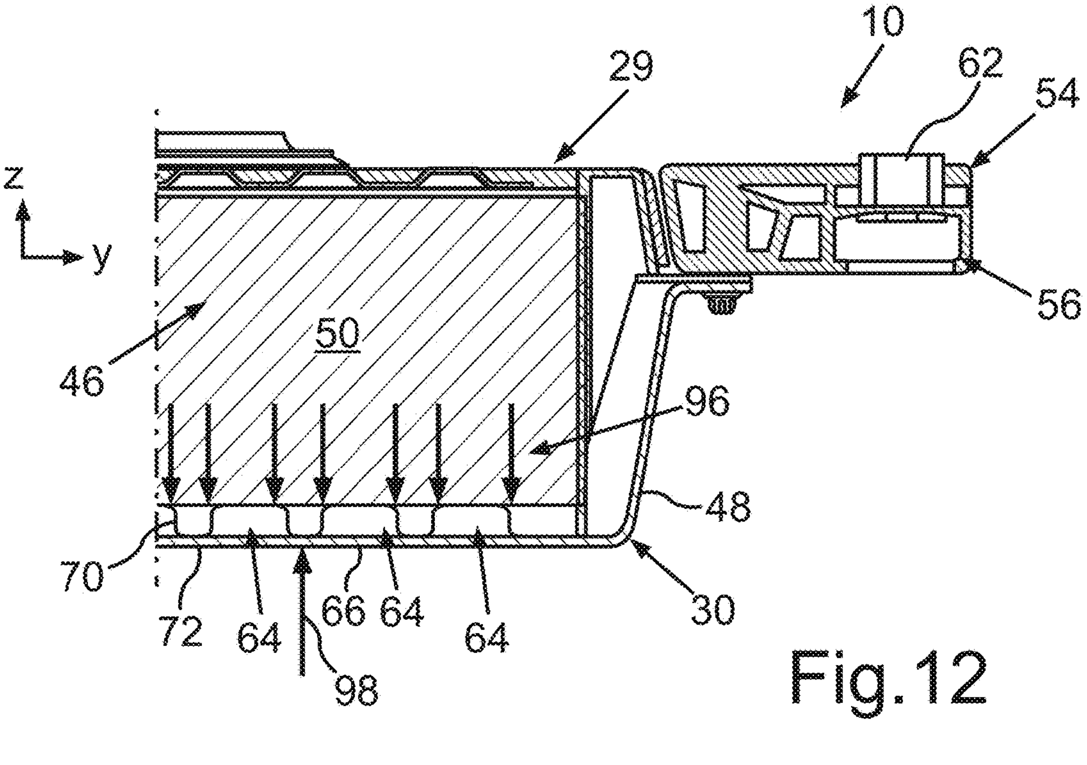
FIG. 12 shows an excerpt from a further schematic cross-sectional view through the energy store.

Finally, arrows 96 are used in FIG. 12 to illustrate that any localized load, shown by an arrow 98, acting in the vehicle vertical direction can be transmitted to the structural element 70 via the component 72 and forwarded to the intercell structure by means of the structural element 70, at least substantially over a large area. As a result, excessive localized loading of the storage cells 46 and of the intercell structure, which is also referred to as a cell interstructure, can be avoided.

The invention claimed is:

1. An arrangement, comprising:

an electrical energy store (10) on a body shell (12) for a passenger car;

wherein the body shell (12) has two side sills (14) between which a main floor (16) extends;

wherein an entirety of the main floor (16) is formed by a housing cover (29) of a housing (30) of the electrical energy store (10);

wherein the housing (30) has a lower part (48) which is disposed, in a passenger car vertical direction, below the housing cover (29) and has a receiving space (50) in which storage cells (46) for storing electrical energy are disposed, wherein the receiving space (50) is formed by the housing cover (29) and the lower part (48);

wherein the housing cover (29) has cooling ducts (34) through which a coolant is flowable and wherein at least a portion of the electrical energy store (10) is coolable by the coolant;

wherein spaces (68) are disposed between the storage cells (46) and at least parts of a floor (66) of the lower part (48);

wherein cell interspaces disposed between the storage cells (46) are completely filled with an intercell structure such that the housing (30) and the storage cells (46) merge to form a contiguous structural body;

wherein the intercell structure is configured such that forces which act when loads occur in an event of an accident involving the passenger are transmittable via the intercell structure.

2. The arrangement according to claim 1, wherein degassing ducts (64) are disposed in the receiving space (50) through which, in a case of a thermal event in the electrical energy store (10), gas resulting from the thermal event and flowing out of at least one of the storage cells (46) is flowable.

3. The arrangement according to claim 2, wherein the degassing ducts (64) are disposed below the storage cells (46) in the passenger car vertical direction.

4. The arrangement according to claim 3, wherein the degassing ducts (64) are formed at least in part by a zigzag-shaped or wavy structural element (70) which overlaps the storage cells (46) downwards in the passenger car vertical direction.

5. The arrangement according to claim 4, wherein the structural element (70) functions as a load distributor when a force acts on the lower part (48) from bottom to top in the passenger car vertical direction.

6. The arrangement according to claim 4, wherein the structural element (70), as viewed in the passenger car vertical direction, is disposed below the storage cells (46) and above a floor (66) of the lower part (48).

7. The arrangement according to claim 6, wherein the floor (66) is formed by a first component (72) of the lower part (48) and wherein the first component (72) and the structural element (70) are formed separately from one another and are connected to one another.

8. The arrangement according to claim 2, wherein the gas flowing out of at least one of the storage cells (46) during the thermal event is conductable rearwards in a passenger car longitudinal direction by the degassing ducts (64) to bursting elements located at points (88) on the lower part (48).

9. The arrangement according to claim 1, wherein the storage cells (46) are secured to the housing cover (29).

10. The arrangement according to claim 1, further comprising a protective structure (52), wherein the protective structure (52) overlaps the storage cells (46) on both sides towards an outside in a passenger car transverse direction and wherein the protective structure (52) is disposed in the receiving space (50).

11. The arrangement according to claim 1, wherein the housing cover (29) has a frame (54) with lateral energy absorption elements (56) and wherein each of the lateral energy absorption elements (56) has a respective plurality of hollow chambers (58).

12. An electrical energy store (10) for mounting on a body shell (12) of a passenger car, comprising:

a housing (30) which has a receiving space (50) in which storage cells (46) for storing electrical energy are disposed, wherein the receiving space (50) is formed by a housing cover (29) and a lower part (48);

wherein the housing cover (29) has cooling ducts (34) through which a coolant is flowable and wherein at least a portion of the electrical energy store (10) is coolable by the coolant;

wherein spaces (68) are disposed between the storage cells (46) and at least parts of a floor (66) of the lower part (48);

wherein cell interspaces disposed between the storage cells (46) are completely filled with an intercell structure such that the housing (36) and the storage cells (46) merge to form a contiguous structural body;

wherein the intercell structure is configured such that forces which act when loads occur in an event of an accident involving the passenger are transmittable via the intercell structure.

13. The electrical energy store (10) according to claim 12, further comprising a protective structure (52), wherein the protective structure (52) overlaps the storage cells (46) on both sides towards an outside in a passenger car transverse direction and wherein the protective structure (52) is disposed in the receiving space (50).

14. The electrical energy store (10) according to claim 13, wherein the protective structure (52) forms a frame into which the storage cells (46) are inserted.

15. The electrical energy store (10) according to claim 13, wherein the storage cells (46) are connected to one another and to the protective structure (52) by the intercell structure as part of the contiguous structural body.

* * * * *